United States Patent
Chan

(10) Patent No.: US 6,539,446 B1
(45) Date of Patent: Mar. 25, 2003

(54) RESOURCE LOCKING APPROACH

(75) Inventor: Wilson Wai Shun Chan, San Mateo, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/307,043

(22) Filed: May 7, 1999

(51) Int. Cl.⁷ .............................................. G06F 12/14
(52) U.S. Cl. ........................................ 710/200; 714/6
(58) Field of Search ..................... 710/200; 711/147, 711/100; 714/1, 2, 6

(56) References Cited

U.S. PATENT DOCUMENTS

| | | | | |
|---|---|---|---|---|
| 4,733,352 A | * | 3/1988 | Nakamura et al. | 711/152 |
| 5,060,144 A | * | 10/1991 | Sipple et al. | |
| 5,155,845 A | * | 10/1992 | Beal et al. | 714/6 |
| 5,202,971 A | * | 4/1993 | Henson et al. | 707/8 |
| 5,408,629 A | * | 4/1995 | Tsuchiva et al. | 711/151 |
| 5,423,044 A | * | 6/1995 | Sutton et al. | 710/200 |
| 5,678,026 A | * | 10/1997 | Vartti et al. | 711/152 |
| 5,987,550 A | * | 11/1999 | Shagam | 710/119 |
| 6,076,126 A | * | 6/2000 | Shagam | 710/108 |
| 6,182,186 B1 | * | 1/2001 | Daynes | 710/200 |

* cited by examiner

Primary Examiner—Xuan M. Thai
(74) Attorney, Agent, or Firm—Hickman Palermo Truong & Becker LLP; Edward A. Becker

(57) ABSTRACT

A novel locking approach for managing access to resources generally includes generating and storing duplicate lock data that may be used if the original lock data upon which the duplicate lock data is based is lost or otherwise becomes unavailable. In response to granting a lock on a resource to a first process, lock data is generated that indicates that the lock on the resource was granted to the first process. Duplicate lock data is generated that indicates that the lock on the resource was granted to the first process. When a change is made to the lock data, the duplicate lock data is updated to reflect the change made to the lock data. If the lock data is lost or otherwise becomes unavailable, the duplicate lock data may be used to continue managing access to the resource.

15 Claims, 4 Drawing Sheets

RESOURCE LOCKING APPROACH

FIELD OF THE INVENTION

The present invention relates to information systems, and more specifically, to an approach for providing access to resources in information systems.

BACKGROUND OF THE INVENTION

In information systems, processes require access to resources to perform work. As used herein, the term "resource" refers to any object that can be accessed in an information system. In a hardware context, examples of resources include, but are not limited to, printers, disk drives and memory. In a software context, examples of resources include, but are not limited to, data items and routines. In information systems it is often desirable to allow only one process at a time to access a particular resource to maintain consistency. For example, if while a first process is updating a particular resource, a second process is allowed to read from the particular resource, then the second process may read an intermediate value of the particular resource that is different than the final value of the particular resource after the first process has completed its updates. As a result, the second process may erroneously believe that at the time the second process read from the particular resource, that the particular resource reflected all of the changes made by the first process. In this situation, an inconsistency has been introduced into the information system with respect to the value of the concurrently accessed particular resource, thereby compromising the integrity of the data on the information system.

To address situations such as this, various mechanisms are used to ensure the integrity of resources that can be accessed by multiple processes. One type of mechanism used to coordinate access to shared resources is referred to as a lock. In its most general form, a lock is data that indicates that a particular process has been granted certain rights with respect to a resource. There are many types of locks. The type and parameters of a lock determine the scope of the access rights granted to the process that holds the lock. For example, shared locks may be shared on the same resource by many processes, while exclusive locks are only granted to a single process and prevent other locks from being granted on the same resource.

In the previous example, the first process would request and be granted a lock on the particular resource prior to updating the particular resource. While the first process holds the lock on the particular resource, the first process may make updates to the particular resource, but the second process may not access the particular resource. Once the first process has completed updating the particular resource, the lock is released. The second process can then access the particular resource and see all of the updates made to the particular resource by the first process.

Locks are typically allocated and managed by an entity referred to as a lock manager. Lock managers are responsible for maintaining data that specifies the status of locks for a set of resources. Lock managers sometimes also maintain a lock request queue that specifies pending lock requests for resources managed by the lock managers. In distributed computing systems, lock managers and their assigned resources may reside on different nodes, or may be located on the same node. As used herein, the term "node" refers to any type of computing entity. Thus, a single computer may either be a single node or support multiple nodes.

One of the problems with locking mechanisms is that when a particular lock manager fails, or the node on which the particular lock manager resides fails, the lock data maintained by the particular lock manager can be corrupted or lost. Specifically, the data that specifies the status of locks for the particular resources assigned to the particular lock manager and the lock request queue data can be corrupted or lost.

One of the consequences of this type of failure is that it is not immediately known which resources associated with the lost lock data were locked by processes at the time of the failure. As a result, no new locks can be granted on the resources until the lock data is re-built which can cause undesirable processing delays. These resources are sometimes referred to as "frozen" resources.

FIG. 1 is a block diagram of a distributed computing arrangement 100 on which a conventional locking mechanism is employed. Arrangement 100 includes three nodes, identified as NODE1, NODE2, NODE3 and a resource R1. A lock manager LM resides on NODE2 and is responsible for managing access to resource R1. Specifically, lock manager LM grants locks to processes that require access to resource R1. Lock manager LM may also be responsible for managing access to other resources (not illustrated).

Lock manager LM generates and maintains lock data 102 on NODE2. Lock data 102 contains data that specifies what processes, if any, have been granted locks on resource R1. Lock data 102 also contains data that specifies any pending lock requests for resource R1. When a change in lock status for resource R1 occurs, for example when a new lock is granted or when an existing lock is released, lock manager LM causes lock data 102 to be updated to reflect the change in lock status.

Suppose process P1 requires access to resource R1. Process P1 requests a lock on resource R1 from lock manager LM. Lock manager LM determines whether any other processes currently hold locks on resource R1 that are incompatible with the lock requested by process P1. If no other processes currently hold locks on resource R1 that are incompatible with the lock request from process P1 and if there are no other pending lock requests for resource R1, then lock manager LM grants a lock on resource R1 to process P1 by updating lock data 102 and notifies process P1 that a lock on resource R1 has been granted to process P1. Once process P1 receives the lock grant notification, process P1 can access and update resource R1. When process P1 no longer requires access to resource R1, process P1 notifies lock manager LM accordingly. Lock manager LM then releases the lock on resource R1 to process P1 by updating lock data 102.

Suppose that while the lock on resource R1 is granted to process P1 that lock data 102 is lost or otherwise becomes unusable, for example by a failure of lock manager LM or a failure of NODE2. In this situation, the resource management duties previously performed by lock manager LM are assigned to another lock manager (not illustrated) and lock data 102 must be re-generated. Determining which processes had locks on resource R1 is usually obtained from the processes themselves. For example, this may be accomplished by broadcasting a message to all processes that a failure has occurred and requesting processes that held locks on resources managed by lock manager LM to inform the new lock manager about the locks they held. In addition, the new lock manager will need to know which processes had pending requests for a lock on resource R1 in a lock request queue of lock data 102. If the lock requests cannot be determined from the processes, then processes will have to re-submit lock requests on resource R1 to the new lock manager. During the time that lock data 102 is being re-generated, resource R1 is frozen, meaning that no new locks are granted on resource R1.

In situations where lock manager LM was responsible for managing access to a large number of resources, re-generating lock data 102 can require a large amount of time and system resources. Moreover, all resources managed by lock manager LM must be frozen during recovery since it is not known whether any processes held locks on those resources. This can have a significant adverse affect on other processes that require access to any resources that were managed by lock manager LM. Furthermore, in situations where a determination cannot be made as to which processes held locks on resource R1 at the time of the failure, the processes that held locks on resource R1 will have to re-submit a request for a lock on resource R1 to the new lock manager and the changes made by those processes will be lost.

Therefore, based on the need to control access to resources by processes and the limitations in the prior approaches, an approach for controlling access to resources that does not suffer from limitations inherent in conventional locking approaches is highly desirable.

SUMMARY OF THE INVENTION

According to one aspect of the invention a method is provided for managing access to a particular resource. According to the method, a request is received for a lock on the particular resource from a first process residing on a first node. Lock data is generated on a second node that indicates that a lock on the particular resource has been granted to the first process. In addition, duplicate lock data is generated on a third node that indicates that the lock on the particular resource has been granted to the first process.

According to another aspect of the invention, a computer system is provided that comprises a resource and a locking mechanism for managing access to the resource. The locking mechanism is configured to generate, in response to a lock request from a first process, lock data that indicates that a lock has been granted on the resource to the first process. The locking mechanism is also configured to generate duplicate lock data that indicates that the lock has been granted on the resource to the first process.

According to another aspect of the invention, a distributed computing system is provided that comprises a first node, a second node communicatively coupled to the first node and a locking mechanism residing on the first node. The locking mechanism is configured to manage access to a particular resource by granting locks on the particular resource. The locking mechanism is also further configured to generate lock data indicative of locks granted on the particular resource. The locking mechanism is further configured to cause duplicate lock data to be generated on the second node, wherein the duplicate lock data is indicative of locks granted on the particular resource.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

FUNCTIONAL OVERVIEW

A novel locking approach for managing access to resources, according to an embodiment of the invention, generally involves generating and maintaining duplicate lock data that is used if the original lock data is lost or becomes unusable for any reason. When original lock data is generated, duplicate lock data is also generated and periodically updated to reflect changes made to the original lock data. If the original lock data is lost or becomes unusable, for example because of a failure of the lock manager or a failure of the node on which the lock data resides, the duplicate lock data is used to continue managing access to resources.

Figure 1:
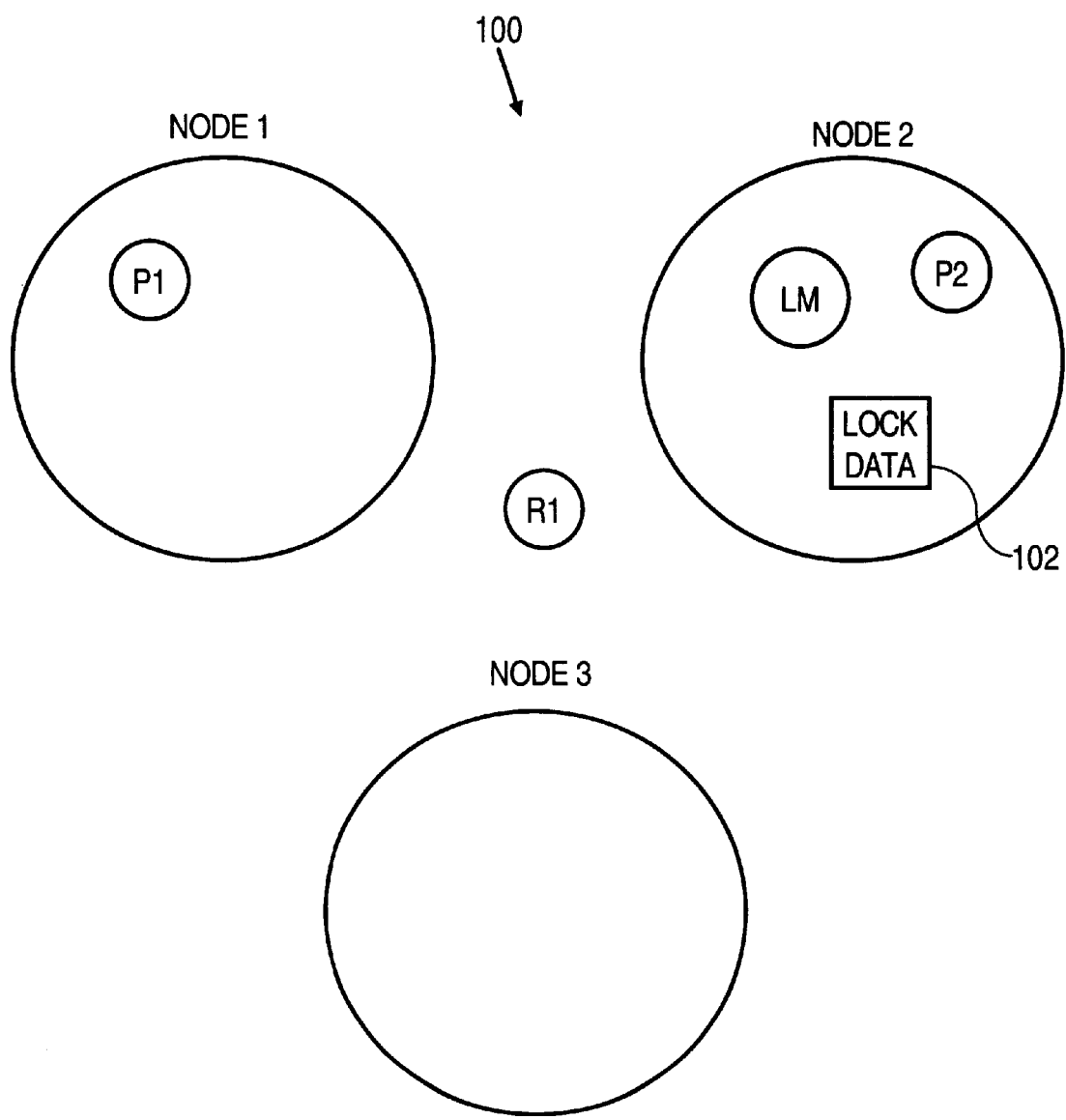
FIG. 1 is a block diagram illustrating a conventional approach for managing access to resources.
Figure 2A:
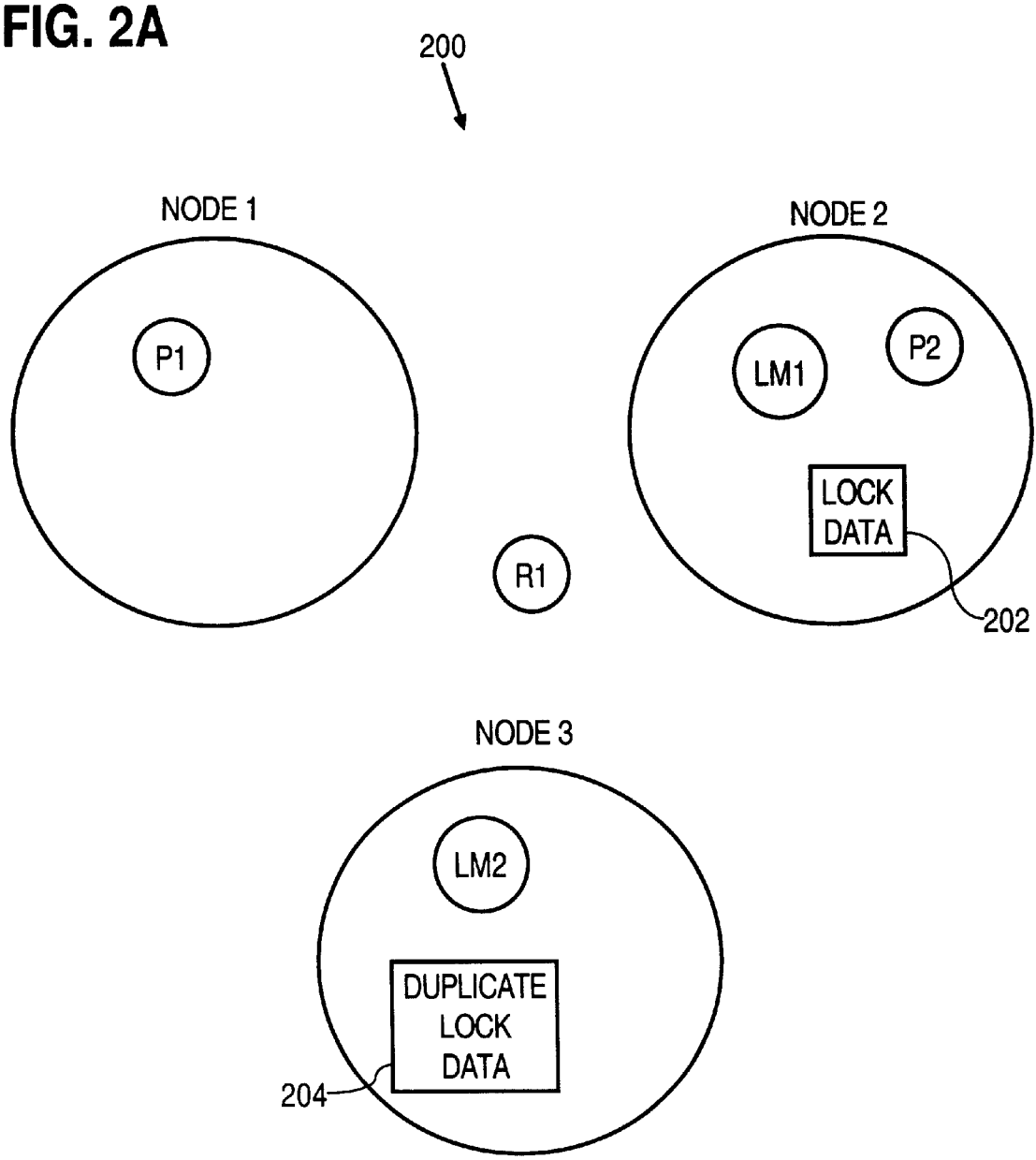
FIGS. 2A and 2B are block diagrams illustrating an approach for managing access to resources according to an embodiment of the invention.

FIG. 2A is a block diagram of a distributed computing arrangement 200 that illustrates the novel locking approach for managing access to resources according to an embodiment of the invention. Arrangement 200 includes three nodes, identified as NODE1, NODE2, NODE3 and a resource R1, accessible by nodes NODE1, NODE2 and NODE3. A lock manager LM1 resides on NODE2 and is responsible for managing access to resource R1. Specifically, lock manager LM1 grants locks to processes that require access to resource R1. Lock manager LM1 may also be responsible for managing access to other resources (not illustrated).

Lock manager LM generates and maintains lock data 202 on NODE2. Lock data contains data that specifies what processes, if any, have been granted locks on resource R1. Lock data 202 also contains data that specifies any pending lock requests for resource R1. When a change in lock status for resource R1 occurs, for example when a new lock is granted or when an existing lock is released, lock manager LM1 causes lock data 202 to be updated to reflect the change in lock status.

According to an embodiment of the invention, duplicate lock data 204 is generated and maintained on NODE3. Duplicate lock data 204 contains data that specifies what processes, if any, currently hold locks on resource R1. When lock data 202 is updated to reflect a change in lock status for resource R1, duplicate lock data 204 is also updated to reflect the change in lock status for resource R1. For example, suppose a process P1 that resides on NODE1 currently holds a lock on resource R1. Lock data 202 and duplicate lock data 204 contain data that specifies that process P1 holds a lock on resource R1. Further suppose that the lock on resource R1 to process P1 is released and a new lock on resource R1 is granted to a process P2 that resides on NODE2. Lock data 202 and duplicate lock data 204 are updated to specify that process P1 no longer holds a lock on resource R1 and that a new lock has been granted on resource R1 to process P2.

If lock data 202 is lost, or otherwise becomes unusable for any reason, duplicate lock data 204 can be immediately used to determine the lock status for resource R1 and to allow the process that was holding a lock on resource R1 at the time of the failure to continue to access and make updates to resource R1. For example, in the event of a catastrophic failure of NODE2, a second lock manager LM2 that resides on NODE3 can immediately use duplicate lock data 204 to manage access to resource R1 since duplicate lock data 204 accurately represents the lock status of resource R1 at the time NODE2 failed. This can significantly reduce the amount of time and system resources that are required to perform recovery since lock data 202 does not have to be re-generated and resource R1 does not have to be frozen. Lock manager LM2 can then proceed to service new lock requests using duplicate lock data 204.

Duplicate lock data 204 may be maintained in volatile or non-volatile storage and may be located on the same node as lock data 202 or on a different node. Although duplicate lock data 204 may be maintained on the same node as lock data 202, i.e., on NODE2, maintaining duplicate lock data 204 in a location other than NODE2 ensures that a single node failure will not affect both lock data 202 and duplicate lock data 204. Additional copies of duplicate lock data 204 may be maintained on other nodes to a provide further redundancy and increase the level of fault tolerance.

DETAILED DESCRIPTION

Figure 2B:
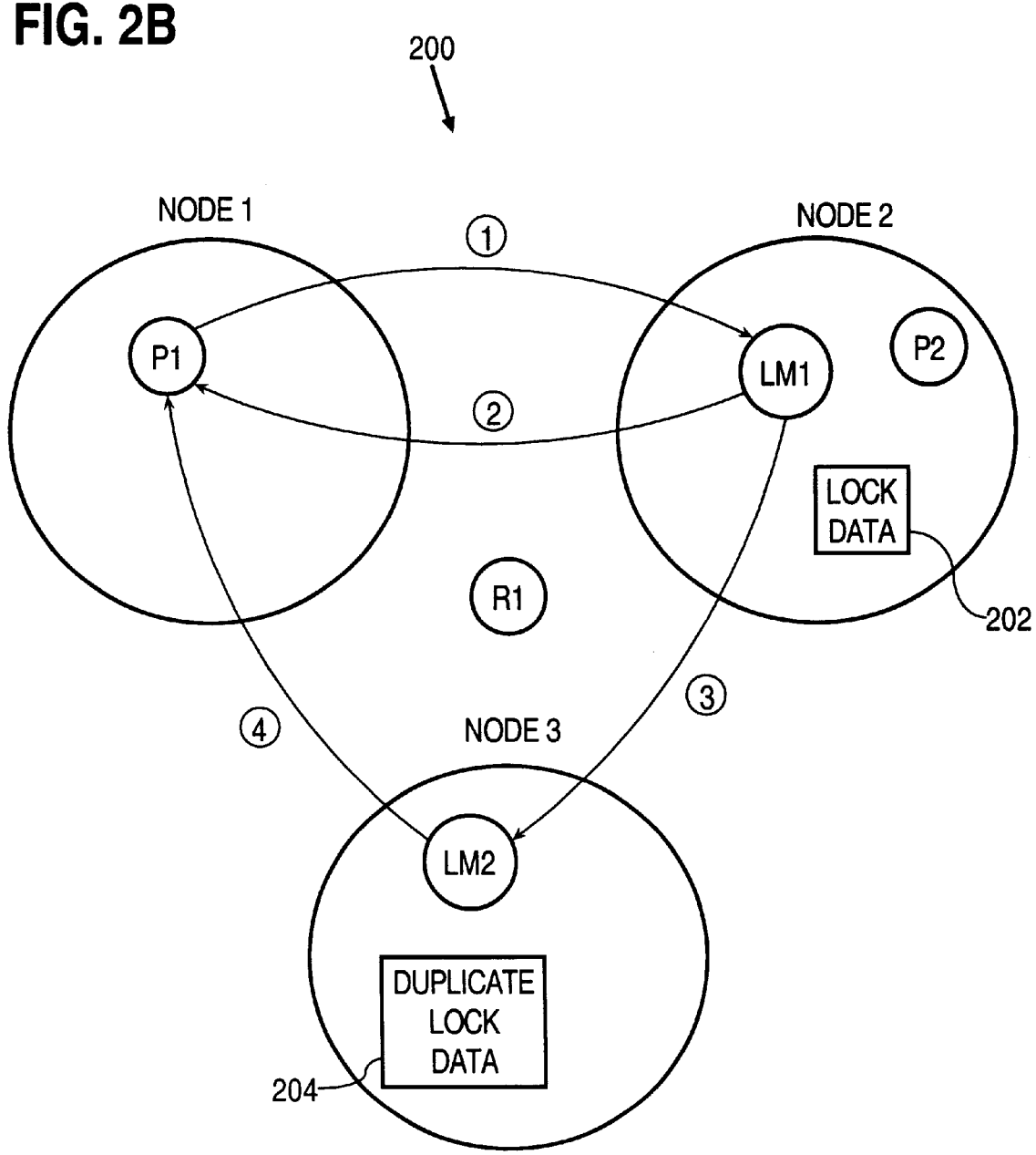

The novel locking approach for managing access to resources is now described in more detail with reference to FIG. 2B. Referring to FIG. 2B, suppose that process P1 requires access to resource R1. As indicated by the lines and sequence numbers in FIG. 2B, process P1 requests a lock on resource R1 from lock manager LM1. Lock manager LM1 examines lock data 202 to determine whether the lock requested by process P1 can be generated. A lock on resource R1 can be granted to process P1 when (1) there are no processes currently holding locks on resource R1, or (2) the type of lock requested by process P1 would not be inconsistent with any existing locks held by other processes on resource R1 or any locks requested in lock requests that are queued ahead of the request of P1. For example, if process P1 requests an exclusive lock on resource R1, then the exclusive lock can only be granted to process P1 if no other processes hold locks on resource R1. On the other hand, if process P1 requests a shared lock on resource R1 and another process holds a shared lock on resource R1, then a shared lock can be granted to process P1.

For purposes of the present example, it is presumed that no processes hold locks on resource R1 at the time process P1 requests a lock on resource R1. Thus, the type of lock requested by process P1 is unimportant. In this situation, lock manager LM1 grants a lock on resource R1 to process P1 by updating lock data 202 to reflect that a lock on resource R1 has been granted to process P1. Lock manager LM1 then notifies process P1 that a lock on resource R1 has been granted to process P1.

At this point in time, according to an embodiment of the invention, process P1 may prepare to update resource R1 but is not permitted to make any updates to resource R1 until process P1 receives notification that duplicate lock data 204 has been updated to reflect that a lock on resource R1 has been granted to process P1. For example, in the context where resource R1 is a data block, process P1 may read a copy of the data block into volatile memory but is not permitted to apply changes to the copy of the data block until process P1 receives notification that duplicate lock data 204 has been updated to reflect that a lock on resource R1 has been granted to process P1. Under some circumstances, by the time process P1 has read a copy of the data block into local memory, process P1 will have received notification that duplicate lock data 204 has been properly updated. In this situation, there is no additional latency attributable to making process P1 wait for the notification before allowing process P1 to update its copy of the data block. In other circumstances, process P1 will have read a copy of the data block into local memory before receiving the notification that duplicate lock data 204 was properly updated and must wait for the notification.

At approximately the same time that lock manager LM1 notifies process P1 that a lock on resource R1 has been granted to process P1, lock manager LM1 notifies another lock manager LM2, that resides on NODE3, that a lock on resource R1 has been granted to process P1. Lock manager LM2 causes duplicate lock data 204 to be updated to reflect that a lock on resource R1 has been granted to process P1.

After lock manager LM2 has updated lock data 204 to reflect that a lock on resource R1 has been granted to process P1, lock manager LM2 notifies process P1 that duplicate lock data 204 has been properly updated so that process P1 can begin updating the copy of the data block residing in volatile memory.

When process P1 no longer requires access to resource R1, process P1 notifies lock manager LM1 and the lock on resource R1 to process P1 is released. Lock manager LM1 updates lock data 202 to release the lock on resource R1 to process P1. Lock manager LM1 also notifies lock manager LM2 that the lock on resource R1 to process P1 has been released. Lock manager LM2 then updates duplicate lock data 204 to reflect that the lock on resource R1 to lock manager LM1 has been released.

Maintaining duplicate lock data 204 provides the benefit that if lock data 202 is lost or otherwise becomes unusable, for example due to a failure of NODE2, resource R1, as well as any other resources managed by lock manager LM1, is not frozen during recovery.

Although the updating of duplicate lock data 204 is described as being performed by lock manager LM2, any type of process may be used to update duplicate lock data 204 to reflect changes made to lock data 202.

In some situations, at the time process P1 requests a lock on resource R1, another process may be holding a lock on resource R1 that is incompatible with the lock requested by process P1. For example, assume that a process P2 that resides on NODE2 holds an exclusive lock on resource R1. When lock manager LM1 receives the request for a lock on resource R1 from process P1, lock manager LM1 examines lock data 202 to determine whether any processes hold locks on resource R1 that are incompatible with the lock requested by process P1. Since lock data 202 indicates that process P2 currently holds an exclusive lock on resource R1, a lock on resource R1 cannot be granted to process P1. Lock manager LM1 does, however, update lock data 202 to indicate the pending lock request by process P1. According to one embodiment of the invention, only data in lock data 202 that indicates the currently held locks is copied to duplicate lock data 204. As a result, lock manager LM1 does not notify lock manager LM2 to update duplicate lock data 204 since a lock on resource R1 has not yet been granted to process P1.

Embodiments of the invention are also applicable to applications where lock manager LM1, upon determining that the lock request from process P1 is incompatible with a lock on resource R1 held by process P2, informs process P2 that a lock on resource R1 has been requested by another process. In this situation, process P2 may complete its changes, for example by generating sufficient data to make the changes permanent, and then release its lock on resource R1. A lock on resource R1 can then be granted to process P1 as previously described.

When process P2 no longer requires access to resource R1, process P2 notifies lock manager LM1 that process P2 no longer requires access to resource R1. Lock manager LM1 releases the lock on resource R1 by updating lock data 202 to reflect that the lock on resource R1 to process P2 has been released. Lock manager LM1 then examines lock data 202 to determine whether there are any pending requests for a lock on resource R1. Assuming either that there are no requests for a lock on resource R1 other than the request by process P1, or that the next lock on resource R1 is to be granted to process P1, lock manager LM1 grants a lock on resource R1 to process P1 by updating lock data 202 to reflect that a lock on resource R1 has been granted to process P1. Lock manager LM1 then notifies both process P1 and lock manager LM2 that a lock on resource R1 has been granted to process P1 and the process continues as described previously herein.

In some situations, process P1 is notified that a lock has been granted on resource R1 to process P1, but process P1 does not receive a notification from lock manager LM2 that duplicate lock data 204 has been updated to reflect the granting of the lock on resource R1 to process P1. This can occur for many reasons. For example, a failure of lock manager LM1, a failure of NODE2, or a failure in the link between NODE2 and NODE3 may prevent lock manager LM1 from notifying lock manager LM2 that a lock has been granted on resource R1 to process P1. This would result in lock manager LM2 not updating duplicate lock data 204 and not notifying process P1 accordingly. Alternatively, a failure of lock manager LM2 or a failure of NODE3 may prevent lock manager LM2 from updating duplicate lock data 204 to reflect that a lock on resource R1 has been granted to process P1. Even if duplicate lock data 204 was properly updated, a failure of lock manager LM2, a failure of NODE3, or a failure of the link between NODE3 and NODE1 may prevent lock manager LM2 from notifying process P1 that duplicate lock data 204 was properly updated.

According to one embodiment of the invention, if failure criteria are satisfied, then process P1 releases its lock on resource R1 without making any updates to resource R1. The failure criteria employed may depend upon the requirements of a particular application. For example, the failure criteria may include a timeout that is triggered after a specified period of time. Thus, if after a specified period of time, process P1 has not received notification that duplicate lock data 204 has been properly updated, process P1 releases its lock on resource R1.

The specified period of time may be measured from various starting points. For example, the specified period of time may be measured from the time process P1 receives notification from lock manager LM1 that process P1 has been granted a lock on resource R1. As another example, the specified period of time may be measured from the time that process P1 requests a lock from lock manager LM1 to cover situations where lock manager LM1 fails.

Failure criteria may also include a failure in distributed computing arrangement 200. In some situations it may be possible for process P1 to determine that the lack of an acknowledge from lock manager LM2 is attributable to a failure in distributed computing arrangement 200. For example, distributed computing environment may include a particular mechanism by which process P1 can determine whether a node, or even a particular process, has failed. If this capability is available, then process P1 may use the particular mechanism to determine whether the absence of an acknowledgement from lock manager LM2 is attributable to a node or process failure. For example, process P1 may be able to determine that NODE2 or NODE3 has failed, or that lock manager LM1 or lock manager LM2 has failed. Therefore, according to one embodiment of the invention, if process P1 determines that the absence of an acknowledge from lock manager LM2 is attributable to a failure, then process P1 releases its lock on resource R1.

In some situations, a process can receive a requested version of a data block directly from another process, in peer-to-peer fashion, instead of from non-volatile storage. This type of transfer is referred to herein as a "direct transfer" and is typically performed using a messaging protocol over a link between the nodes on which the two processes reside.

Direct transfers are typically used when a process has read a copy of a data block from non-volatile storage into local volatile storage and then applied changes to the copy in volatile storage to create a new version of the data block. When another process requires the new version of the data block, it is often much faster to provide the copy that resides in the local volatile storage, instead of storing the new version to non-volatile storage and then reading the new version from non-volatile storage.

For example, referring to FIG. 2B, suppose that process P2 had previously loaded a copy of a particular data block into local volatile storage on NODE2 and made updates to the copy of the particular data block to create a new version of the particular data block. After process P1 is granted a lock on the particular data block, process P1 requests the new version of the data block on NODE2 that was created by process P2.

One way for process P1 to get the new version of the particular data block is for the new version to be written to non-volatile storage and then read from non-volatile storage and provided to process P1. This requires both a write and a read to and from non-volatile storage. Another way for process P1 to get the new version of the particular data block is for the new version to be provided directly from process P2 to process P1 using a direct transfer. In general, the direct transfer allows process P1 to receive the new version of the data block faster than if the new version had to be written to non-volatile storage by process P2 and then read from non-volatile storage by process P1.

One problem with direct transfers is that process P1 may receive the requested data before process P1 is notified that duplicate lock data 204 has been updated to reflect that a lock on resource R1 was granted to process P1. As a result, process P1 may have already received the requested data and then have to wait for the notification from lock manager LM2 before it is free to use resource R1. This latency can adversely affect processing performance and data concurrency.

Therefore, according to another embodiment of the invention, process P1 is permitted to begin updating the requested data as soon as the requested data is received by process P1, regardless of whether process P1 has been notified of either the lock grant from lock manager LM1 or the confirmation that duplicate lock data 204 has been properly updated. However, process P1 is not permitted to make its updates to the data permanent until process P1 has been notified that duplicate lock data 204 has been properly updated.

For example, process P1 requests a lock on a particular data block. The new version of the data block has just been created by process P2 and resides in volatile storage on NODE2. Lock manager LM2 grants a lock on the particular data block to process P1 and the new version of the data block is supplied to process P1 directly from process P2 in response to a request from process P1. Process P1 proceeds to make updates to the new version of the data block, regardless of whether process P1 has received either the lock grant notification from lock manager LM1 or the duplicate lock data 204 update confirmation from lock manager LM2. Before process P1 makes its updates to the new version of the data block permanent, process P1 determines whether a notification has been received that duplicate lock data 204 has been properly updated. Note that in this situation, there is no need for process P1 to determine whether a lock grant from lock manager LM1 has been received. Receipt of the notification from lock manager LM2 that duplicate lock data 204 confirms that the lock grant must have been issued by lock manager LM1. Furthermore, in this situation there is no need for lock manager LM1 to send a lock confirmation to process P1. If, by the time process P1 completes its updates to the new version of the data block, process P1 has not received confirmation that duplicate lock data 204 has been properly updated, then the failure criteria described herein may be used to determine whether a failure has occurred.

Although embodiments of the invention have been described herein primarily in the context of using duplicate lock data 204 in the event of a failure that prevents the lock data 202 from being used, embodiments of the invention are applicable to applications where it is desirable to use duplicate lock data 204 instead of the lock data 202 under other circumstance. For example, referring to FIG. 2A, it may be desirable to use duplicate lock data 204 for managing access to resource R1 instead of lock data 202 for resource management considerations. Specifically, NODE2 may be experiencing a significantly higher level of resource loading relative to NODE1. This might be attributable to other processes, for example process P2, executing on NODE2 that are requiring an unusually large amount of resources. In this situation, it may be advantageous to switch the managing of access to resource R1 from lock data 202 to duplicate lock data 204. Duplicate lock data 204 can then be used as the primary lock data and other duplicate lock data (not illustrated) established on another node, for example NODE1.

IMPLEMENTATION MECHANISMS

The locking approach described herein is applicable to any type of computing environment, and is particularly well suited for distributed computing systems and parallel computing systems. The approach may be implemented as part of a locking mechanism or as a stand-alone process. Furthermore, the approach described herein may be implemented in hardware circuitry, in computer software, or a combination of hardware circuitry and computer software.

Figure 3:
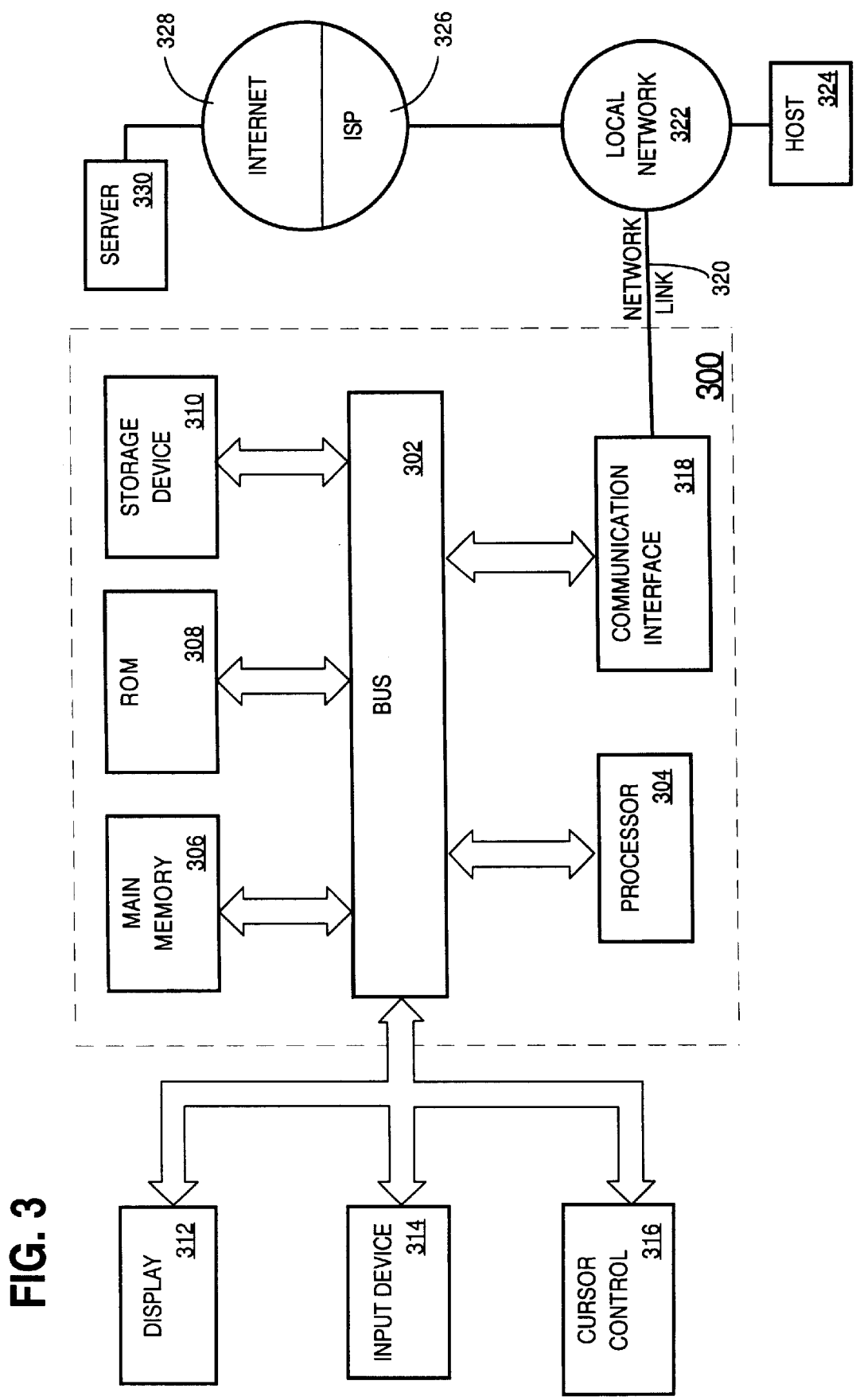
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 farther includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing a locking approach for managing access to resources. According to one embodiment of the invention, the approach is provided by computer system 300 in response to processor 304 executing one or more sequences of one or more instructions contained in main memory 306. Such instructions may be read into main memory 306 from another computer readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides a locking approach for managing access to resources as described herein.

The received code may be executed by processor 304 as it is received, and/or stored in storage device 310, or other non-volatile storage for later execution. In this manner, computer system 300 may obtain application code in the form of a carrier wave.

The novel locking approach for managing access to resources as described herein provides several advantages over prior locking approaches. The use of duplicate lock data allows locking managing duties to be immediately transferred to another lock manager in the event of a failure. This reduces the amount of system resource that are required during recovery since the original lock data does not have to be rebuilt. Furthermore, the approach avoids having to freeze resources after a failure, which can provide faster recovery and improve access to resources.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for managing access to a particular resource, the method comprising the steps of:

receiving a request for a lock on the particular resource from a first process residing on a first node; wherein the first process makes a change to the particular resource prior to knowing whether the duplicate lock data has been generated;

generating on a second node lock data that indicates that a lock on the particular resource has been granted to the first process;

generating duplicate lock data on a third node that indicates that the lock on the particular resource has been granted to the first process; and providing an acknowledge message to the first process to indicate that the duplicate lock data has been generated and that a change made to the particular resource by the first process can be made permanent.

2. The method as recited in claim 1, further comprising the step of providing an acknowledge message to the first process to indicate that the lock on the particular resource has been granted to the first process.

3. The method as recited in claim 1, further comprising if the acknowledge message is not received by the first process after a specified period of time, then the first process undoing the change made to the particular resource.

4. The method as recited in claim 1, further comprising in response to a change made to the lock data, updating the duplicate lock data to reflect the change made to the lock data.

5. A method for managing access to a particular resource, the method comprising the steps of:

receiving a request for a lock on the particular resource from a first process residing on a first node;

generating on a second node lock data that indicates that a lock on the particular resource has been granted to the first process;

generating duplicate lock data on a third node that indicates that the lock on the particular resource has been granted to the first process; and after a failure, using the duplicate lock data to manage access to the particular resource.

6. The method as recited in claim 5, further comprising generating new duplicate lock data on a fourth node that indicates the current lock status for the particular resource.

7. A method for managing access to a particular resource, the method comprising the steps of:

receiving a request for a lock on the particular resource from a first process residing on a first node;

generating on a second node lock data that indicates that a lock on the particular resource has been granted to the first process;

generating duplicate lock data on a third node that indicates that the lock on the particular resource has been granted to the first process; and transferring responsibility for processing lock requests on the particular resource to a duplicate lock manager associated with the duplicate lock data.

8. A system comprising:

a resource; and a locking mechanism for managing access to the resource, wherein the locking mechanism is configured to
generate, in response to a lock request from a first process, lock data that indicates that a lock has been granted on the resource to the first process,
generate duplicate lock data that indicates that the lock has been granted on the resource to the first process, and provide an acknowledge to the first process to indicate that the duplicate lock data has been generated and that a change made to the resource by the first process can be made permanent.

9. A computer-readable medium carrying one or more sequences of one or more instructions for managing access to a particular resource, the one or more sequences of one or more instructions including instructions which, when executed by one or more processors, cause the one or more processors to perform the steps of:

receiving a request for a lock on the particular resource from a first process residing on a first node; wherein the first process makes a change to the particular resource prior to knowing whether the duplicate lock data has been generated;

generating on a second node lock data that indicates that a lock on the particular resource has been granted to the first process;

generating duplicate lock data on a third node that indicates that the lock on the particular resource has been granted to the first process; and providing an acknowledge message to the first process to indicate that the duplicate lock data has been generated and that a change made to the particular resource by the first process can be made permanent.

10. The computer-readable medium as recited in claim 9, further comprising the step of providing an acknowledge message to the first process to indicate that the lock on the particular resource has been granted to the first process.

11. The computer-readable medium as recited in claim 9, further comprising if the acknowledge message is not received by the first process after a specified period of time, then the first process undoing the change made to the particular resource.

12. The computer-readable medium as recited in claim 9, further comprising in response to a change made to the lock data, updating the duplicate lock data to reflect the change made to the lock data.

13. A computer-readable medium carrying one or more sequences of one or more instructions for managing access to a particular resource, the one or more sequences of one or more instructions including instructions which, when executed by one or more processors, cause the one or more processors to perform the steps of:

receiving a request for a lock on the particular resource from a first process residing on a first node;

generating on a second node lock data that indicates that a lock on the particular resource has been granted to the first process;

generating duplicate lock data on a third node that indicates that the lock on the particular resource has been granted to the first process; and after a failure, using the duplicate lock data to manage access to the particular resource.

14. The computer-readable medium as recited in claim 13, further comprising generating new duplicate lock data on a fourth node that indicates the current lock status for the particular resource.

15. A computer-readable medium carrying one or more sequences of one or more instructions for managing access to a particular resource, the one or more sequences of one or more instructions including instructions which, when executed by one or more processors, cause the one or more processors to perform the steps of:

receiving a request for a lock on the particular resource from a first process residing on a first node;

generating on a second node lock data that indicates that a lock on the particular resource has been granted to the first process;

generating duplicate lock data on a third node that indicates that the lock on the particular resource has been granted to the first process; and transferring responsibility for processing lock requests on the particular resource to a duplicate lock manager associated with the duplicate lock data.

* * * * *